Aug. 28, 1923.
F. KEC
PROTECTING DEVICE FOR GEARINGS
Filed Aug. 23, 1919
1,466,449
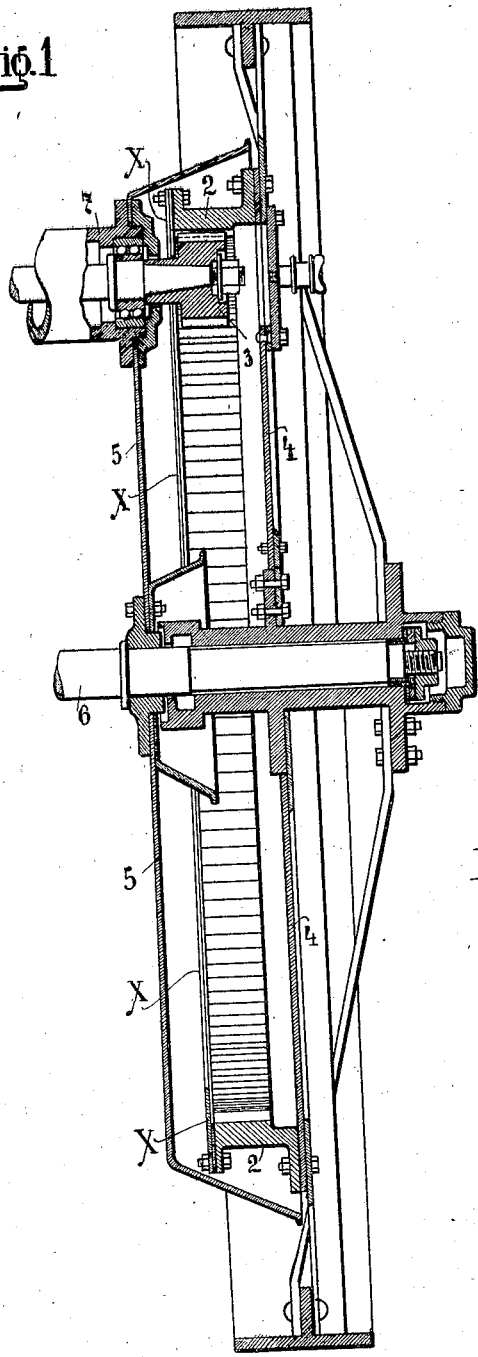
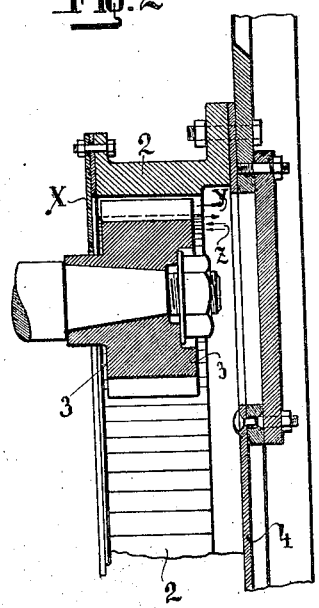
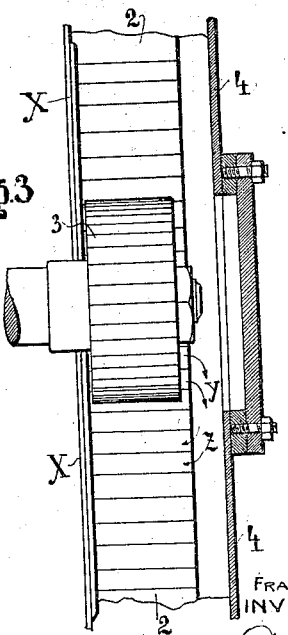
Frank Kec
INVENTOR;
By
his Attorney Patented Aug. 28, 1923.

1,466,449

UNITED STATES PATENT OFFICE.

FRANK KEC, OF PRAGUE, CZECHOSLOVAKIA.

PROTECTING DEVICE FOR GEARINGS.

Application filed August 23, 1919. Serial No. 319,481.

*To all whom it may concern:*

Be it known that I, FRANK KEC, subject of the Republic of Czechoslovakia, residing at Prague, VIII., Českomoravská tř. 205, Czechoslovakia Republic, have invented certain new and useful Improvements in Protecting Devices for Gearings, of which the following is a specification.

In motor vehicles more particularly in motor ploughs, heavy tractors and the like the driving wheels of which are operated by a pinion meshing with an internally toothed wheel and in which the pinion shaft and the driving wheel axle are on the same side of the driving wheel various arrangements for protecting this gearing have been proposed. The majority of these protective arrangements are open to the objection that they do not comprise reliable means for simultaneously preventing the escape of lubricant from the gearing and the entrance of impurities into the same. This deficiency although apparently trifling leads in fact to very detrimental consequences, such as reduction of efficiency, increase of wear and risk of breakage of the gearing, and this is the reason why in the construction of heavy motor vehicles and motor ploughs the pinion gearing has been almost entirely abandoned, though, when properly protected against the escape of lubricant and the entrance of impurities it would be one of the best gearings for heavy vehicles.

The object of the present invention is to remove these deficiencies of the driving wheels of motor vehicles or ploughs with the above mentioned gearing and with this object in view besides the well known outer and inner protecting discs tightly enclosing the gearing a covering ring is mounted on the internally toothed wheel between the said protecting discs.

It has been proposed to provide guide rings for the internally toothed wheel in the case of resiliently mounted wheels driven by pinions, but apart from the fact that these rings only serve for holding in proper position the loosely mounted internally toothed wheel these known arrangements are not intended to obtain nor do obtain the protection forming the object of the present invention.

Also in gearings in general and more particularly in planet gearings various arrangements and constructions of protecting discs have been proposed for enclosing the gearing, but it has never been proposed to provide a covering ring between the well known protecting discs of pinion gearings of the class above referred to, although in this gearing the particular arrangement of the covering ring in combination with the well known protecting discs results in a surprisingly favorable protective effect.

In the annexed drawing a constructional form of the present invention is shown by way of example as applied to driving wheels of motor ploughs. Fig. 1 is a horizontal section of a driving wheel provided with the entire protective device, Fig. 2 shows a detail thereof on a large scale and Fig. 3 is a plan view of Fig. 2.

1 is the driving wheel, 2 is the internally toothed wheel secured to the spokes of the driving wheel and 3 the pinion meshing with the internally toothed wheel. The gearing is enclosed in the well known manner between two protecting discs 4, 5 on opposite sides thereof. The disc 4 is secured to the spokes of the wheel 1 and the disc 5 is attached to the stationary axle 6 of the wheel and to the pinion bearing 7. These discs protect the gearing to a considerable extent against the entrance of impurities from the outside. Besides this known protecting device consisting of the two discs 4 and 5 enclosing the gearing, there is provided at the inner side of the internally toothed wheel 2 a covering ring $x$ tightly secured to this wheel and extending all around the same and closely up to the driving shaft of the pinion.

The covering ring $x$ is so attached to the wheel 2 that it is as close as possible to the face of the pinion whereby the teeth of the wheel 2 and the pinion $x$ are fully covered as far as they engage into each other and the lubricant cannot escape towards the inside of the wheel. Besides this effect the covering ring in combination with the protecting disc 4 provides for a very advantageous distribution of the lubricant. When the pinion revolves the lubricant between the teeth of the pinion and of the wheel 2 engaging with each other at any moment is forced out in the direction of the arrow $y$, Fig. 3, lubricating the sides of the teeth and continuing its way along the arrows $z$ between the teeth of the gearing before they come into engagement with each other. Thereby the superfluous and an efficient lubrication of the gearing is secured with a comparatively small quantity of the lubricant.

Besides by the covering ring $x$ in combination with the protecting disc 5 the additional effect is obtained that the entrance of impurities into the gearing is rendered very difficult. By arranging the covering ring between the protecting discs a sort of labyrinth packing is formed which prevents in a much simpler way than has been hitherto possible in motor vehicles the entrance of impurities into the gearing.

Having now thus described my invention and explained the mode of operation thereof, I claim and desire to secure by Letters Patent:

In a driving gearing for motor vehicles and motor ploughs, the combination of a driving wheel having an internally toothed wheel, a power pinion meshing with the latter and arranged on the same side of the driving wheel plane as the internally toothed wheel, a flat protecting disk carried by the hub of said driving wheel and extending to the periphery of said internally toothed wheel and secured thereto, a second stationary protecting disk having an annular flange extending toward said first named disk and over the internally toothed wheel, the free edge of said second named disk being slightly greater in diameter than said first named disk and extending to the plane of the latter, and a flat covering ring attached to the opposite face of said internally toothed wheel and extending inwardly to provide an internal periphery which is slightly smaller than the internal periphery of the adjacent teeth of said internally toothed wheel.

FRANK KEC.

Witnesses:
 FRIHALY,
 LUDV. BÓRTO.